R. C. POWERS.
POST HOLE AUGER.
APPLICATION FILED APR. 3, 1916.

1,217,062.

Patented Feb. 20, 1917.
2 SHEETS—SHEET 1.

Witnesses

Inventor
R. C. Powers
By Victor J. Evans
Attorney

R. C. POWERS.
POST HOLE AUGER.
APPLICATION FILED APR. 3, 1916.
1,217,062.
Patented Feb. 20, 1917.
2 SHEETS—SHEET 2.
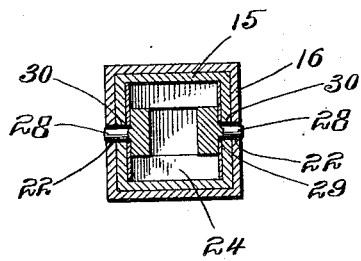
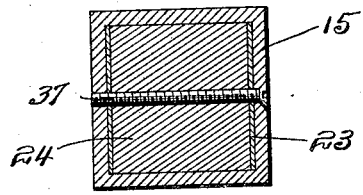
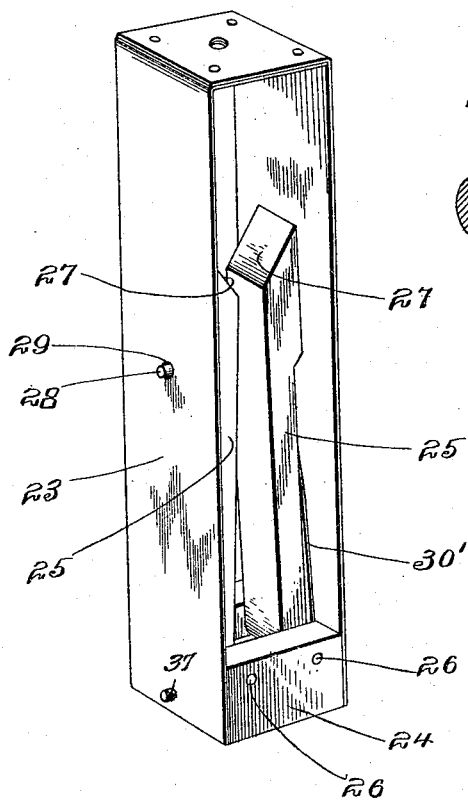
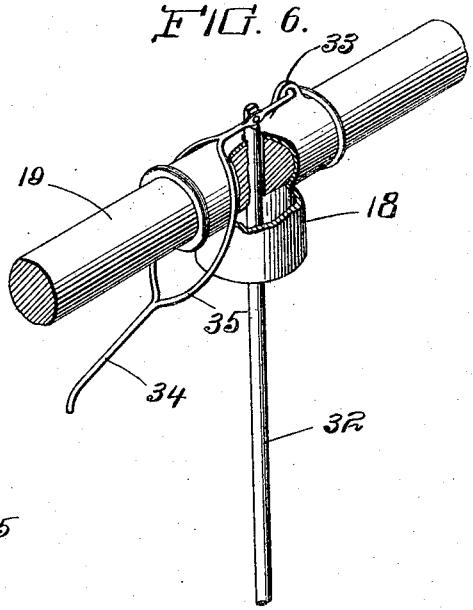
Witnesses
A. C. Newkirk
Inventor
R. C. Powers
By Victor J. Evans
Attorney

UNITED STATES PATENT OFFICE.

RICHARD C. POWERS, OF AIKTOW, SASKATCHEWAN, CANADA.

POST-HOLE AUGER.

1,217,062.  Specification of Letters Patent.  Patented Feb. 20, 1917.

Application filed April 3, 1916. Serial No. 88,687.

*To all whom it may concern:*

Be it known that I, RICHARD C. POWERS, a subject of the King of Great Britain, residing at Aiktow, in the Providence of Saskatchewan and Dominion of Canada, have invented new and useful Improvements in Post-Hole Augers, of which the following is a specification.

This invention relates to post hole augers, and it has for its object to produce a device of this class of simple and improved construction in which the length of the shank carrying the auger head may be varied so as to maintain the operating handle at approximately the same distance above the ground, irrespective of the depth of the hole.

A further object of the invention is to provide a post hole auger with a telescopic stem, the length of which may be easily and quickly varied.

A further object of the invention is to produce a post hole auger having an extensible and collapsible stem composed of tubular sections sliding one within the other, simple and improved means being provided for maintaining the sections in adjusted position with respect to each other.

With these and other ends in view which will readily appear as the nature of the invention is better understood, the same consists in the improved construction and novel arrangement and combination of parts which will be particularly pointed out in the claims.

In the accompanying drawings has been illustrated a simple and preferred form of the invention, it being, however, understood that no limitation is necessarily made to the precise structural details therein exhibited, but that changes, alterations and modifications within the scope of the claims may be resorted to when desired.

In the drawings,—

Fig. 3 is a transverse sectional view taken on the line 3—3 in Fig. 2.

Fig. 4 is a perspective view of the jaw carrying frame and related parts detached from the inner tube.

Fig. 5 is a sectional detail view taken on the line 5—5 in Fig. 2.

Fig. 6 is a perspective detail view with parts broken away showing the top portion or handle of the device, and showing also the means for operating the plunger whereby the locking jaws are actuated.

Corresponding parts in the several figures are denoted by like characters of reference.

Figure 1:
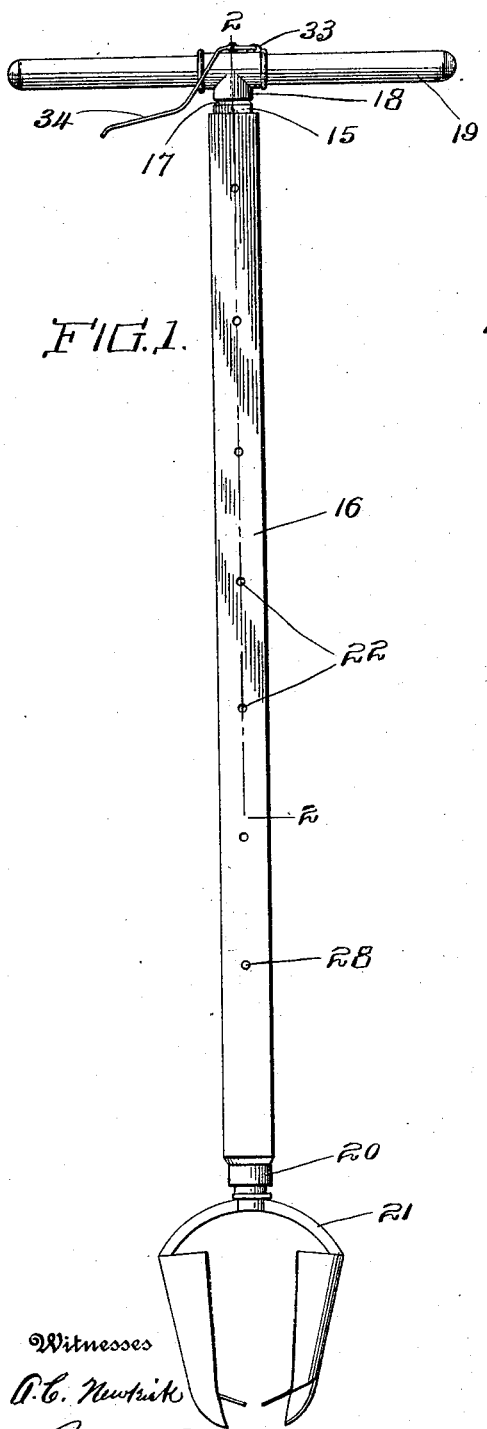
Figure 1 is a view in side elevation of a device constructed in accordance with the invention and showing the stem collapsed.
Figure 2:
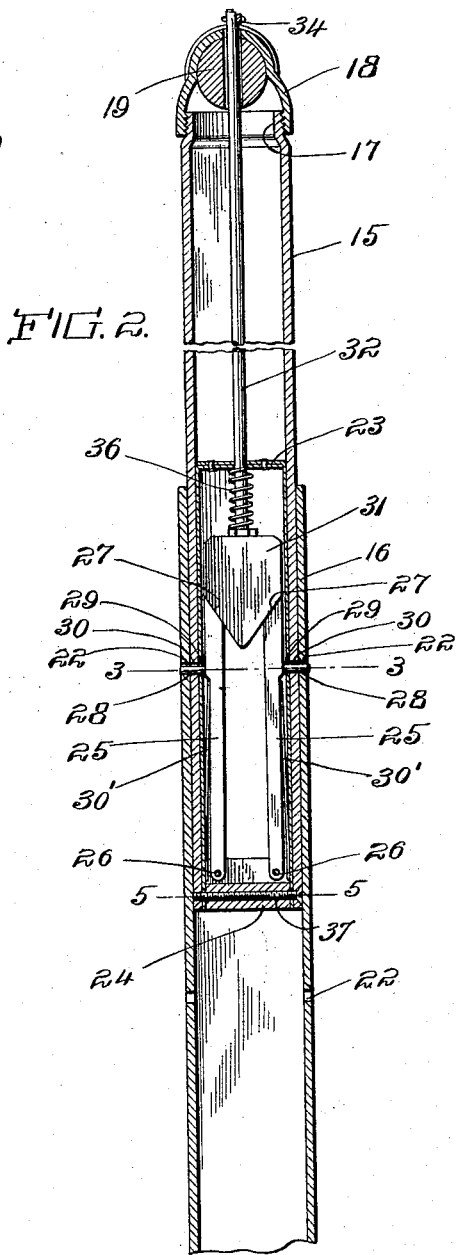
Fig. 2 is a sectional view taken substantially at right angles to Fig. 1 on the line 2—2 in said figure, and showing the stem extended.

The stem of the improved device is composed of tubular members, one of which, 15, slides or telescopes within the other member 16. The tubular members 15, 16 are of square or other non-circular cross section to prevent relative axial rotation of said members. The member 15, which for convenience may be called the upper member, terminates at its upper end in a neck 17 which is threaded for the reception of a T-coupling 18, the head of which receives a rod or handle 19 of proper length to furnish sufficient leverage in operating the device. The lower tubular member 16 terminates at its lower end in a threaded neck 20 on which the auger head 21 is mounted.

The side walls of the lower tubular member 16 are provided with oppositely located apertures 22, the said apertures being disposed in longitudinal series toward the length of the member 16, said apertures being adapted to be engaged by locking devices that are associated with the tubular member 15 and which will now be described. Fitted in the lower end of the tubular member 15 is a rectangular frame 23, preferably made of plate steel, the lower end of said frame having fitted therein a block or casting 24 with which jaws 25 are pivotally connected by pins or pivot members 26, said jaws being provided at their upper ends with opposed bevel faces 27. The jaws 25 are provided on their outer faces with laterally extending pins or engaging members 28 that extend through registering apertures 29, 30 in the frame 23 and in the tube 15, said pins 28 being adapted to engage the apertures 22 in the tubular member 16. Flat springs 30' are interposed between the jaws 25 and the walls of the frame 23, the tendency of said springs being to force the jaws 25 in the direction of each other so as to withdraw the pins 28 from engagement with the apertures 22, thereby permitting the tubular members 15, 16 to move longitudinally with respect to each other. For the purpose of actuating the jaws to project the pins 29 in engagement with the apertures 22 there is provided a wedge-shaped plunger 31 which is adapted to engage between the beveled faces 27 of the jaws 25. The plunger 31 is carried by a rod 32 which extends through the handle 19 and through the head of the T-coupling 18, said head being provided with a lug 33 on which is fulcrumed a lever 34 with which the rod 32 is pivotally connected, said lever having a loop 35 that surrounds the head of the T-coupling, said loop being of such dimensions as to enable the lever to be conveniently actuated. A coiled spring 36 is interposed between the plunger 31 and the top of the frame 23 to force the plunger in a downward direction in engagement with the beveled faces of the jaws 25, the latter being thereby spread apart to cause the pins 28 to engage the apertures 22. By manipulating the lever 34 the plunger may be withdrawn in an upward direction, thereby enabling the jaws to be actuated by the springs 30' thereby retracting the pins 28 from the apertures 22.

The frame 23, the block 24 and the springs 30' are assembled with the inner or upper tube at the lower end of the latter by means of a transverse pin or screw 37.

From the foregoing description taken in connection with the drawings hereto annexed, the operation and advantages of this invention will be readily understood.

It is well known that the ordinary post hole auger is composed of a stem carrying at one end an auger head and at the other end a cross bar or handle whereby the auger may be rotated. When the stem is made sufficiently long to enable a post hole of proper depth to be bored, it will be found that at the time of starting the auger in the ground the cross bar or handle will be so high above the ground that it may not be easily reached or manipulated by a person standing on the ground, particularly when such person is below the average stature. On the other hand, when a deep hole is bored, the operator, if of average stature, is compelled to bend over or even to kneel upon the ground to a position which is very inconvenient for properly manipulating the auger. By the present invention, at the time of starting the auger head in the ground, the telescoping members of the handle may be collapsed, thereby presenting the handle in a convenient position for the operator, no matter whether he be tall or short. As the auger enters the ground, the stem may be extended at intervals by simply manipulating the lever 34 to raise the plunger 31, thereby causing the pins 28 of the jaws 25 to be disengaged from the apertures 22 in the lower tubular section of the stem, thereby enabling the upper section 15 to be raised as far as may be desired, after which, by releasing the lever 34, the spring actuated plunger will force the jaws 25 apart, thereby placing the pins 28 in engagement with apertures 22 other than those previously engaged thereby. It will be readily seen that by such adjustment of the members of the stem, the handle whereby the tool is operated may be maintained nearly at a constant distance above the ground in the most convenient position for the operator, thereby facilitating the work, reducing the strain and enabling the work to be performed in less time and with much less effort than when an ordinary tool having a non-adjustable stem is employed.

Having thus described the invention, what is claimed as new, is:—

1. A device of the class described comprising a lower tubular member of non-circular cross section, an upper tubular member telescoping therein, spring actuated jaws supported in the lower end of the upper member and having laterally extending pins adapted to be projected through the walls of the lower member, said walls being provided with rows of apertures for engagement with said pins, and means for forcing the spring actuated jaws against the tension of their actuating springs.

2. In a device of the class described, a tubular member having opposite side walls provided with rows of apertures, a second tubular member telescoping and non-revoluble with respect to the first mentioned member, a rectangular frame mounted in the lower end of the second tubular member, a block mounted in the lower end of the rectangular frame, jaws pivoted on said block and having beveled end faces and laterally extending pins extending through the walls of the rectangular frame and the tubular member in the direction of the apertures in the side walls of the first mentioned tubular member, flat actuating springs whereby the jaws are actuated to retract the laterally extending fingers with respect to the apertures in the side walls of the first mentioned tubular member, a wedge-shaped plunger carried by the second tubular member, a spring whereby said plunger is projected in the direction of the beveled faces of the jaws, means for retracting the plunger against the tension of its actuating spring, and a transverse fastening member whereby the rectangular frame, the jaw carrying block and the jaw actuating springs are assembled with the second mentioned tubular member.

3. In a device of the class described, a lower tubular member of rectangular cross section carrying an auger head at its lower end, the side walls of said tubular member being provided with series of perforations, an upper tubular member of non-circular cross section slidably engaging the lower tubular member, a handle bar at the upper end of the upper tubular member, a lever fulcrumed on the handle bar and having a loop surrounding the same, a rectangular frame mounted in the lower end of the upper tubular member, said frame and member having registering apertures, spring actuated jaws supported at the lower end of the rectangular frame, said jaws having pins that project through the registering apertures and said jaws being provided with opposed bevel faces, a wedge-shaped plunger slidable in the upper portion of the rectangular frame and engaging the beveled faces of the jaws, a spring interposed between the plunger and the upper end portion of the rectangular frame, and a stem extending through the spring and the upper end portion of the rectangular frame, said stem being connected at one end with the plunger and at the other end with the lever fulcrumed on the handle bar.

In testimony whereof I affix my signature in presence of two witnesses.

RICHARD C. POWERS.

Witnesses:
LILLIE W. STODDART,
E. A. MATTHEWS.

Copies of this patent may be obtained for five cents each, by addressing the "Commissioner of Patents, Washington, D. C."